(12) United States Patent
Smits

(10) Patent No.: US 7,941,402 B2
(45) Date of Patent: May 10, 2011

(54) STORING AND USING CLASSES IN DATABASES

(75) Inventor: Thomas Smits, Unna (DE)

(73) Assignee: SAP AG, Walldorf (DE)

( * ) Notice: Subject to any disclaimer, the term of this patent is extended or adjusted under 35 U.S.C. 154(b) by 511 days.

(21) Appl. No.: 10/949,967

(22) Filed: Sep. 24, 2004

(65) Prior Publication Data

US 2006/0074994 A1 Apr. 6, 2006

(51) Int. Cl.
*G06F 7/00* (2006.01)
(52) U.S. Cl. ........ 707/638; 707/769; 709/226; 709/229; 717/101; 717/102; 717/103; 718/1; 718/104
(58) Field of Classification Search .......... None
See application file for complete search history.

(56) References Cited

U.S. PATENT DOCUMENTS

| | | | | |
|---|---|---|---|---|
| 5,897,642 | A * | 4/1999 | Capossela et al. | ............ 707/203 |
| 5,978,585 | A * | 11/1999 | Crelier | ............ 717/145 |
| 6,272,674 | B1 * | 8/2001 | Holiday, Jr. | ............ 717/174 |
| 6,385,722 | B1 * | 5/2002 | Connelly et al. | ............ 713/2 |
| 6,654,954 | B1 * | 11/2003 | Hicks | ............ 707/203 |
| 6,996,707 | B2 * | 2/2006 | Liang et al. | ............ 713/2 |
| 2002/0055910 | A1 * | 5/2002 | Durbin | ............ 705/64 |
| 2004/0039758 | A1 * | 2/2004 | Li | ............ 707/206 |
| 2004/0177352 | A1 * | 9/2004 | Narayanaswamy et al. | .. 717/169 |
| 2004/0193575 | A1 * | 9/2004 | Chen et al. | ............ 707/3 |
| 2005/0050071 | A1 * | 3/2005 | Debrunner | ............ 707/100 |
| 2005/0278341 | A1 * | 12/2005 | Kostadinov et al. | ............ 707/10 |

\* cited by examiner

*Primary Examiner* — Tim T. Vo
*Assistant Examiner* — Hasanul Mobin
(74) *Attorney, Agent, or Firm* — Blakely Sokoloff Taylor & Zafman LLP

(57) ABSTRACT

Methods and apparatus, including computer systems and program products, for storing and using, such as classes, in databases. One implementation provides a technique for receiving a specified name, retrieving one or more from a database, and for each resource, one or more attributes associated with the resource, wherein each comprises executable instruction code, and wherein the attributes include a name that matches the specified name. The technique further provides for selecting one of the retrieved based on the attributes associated with each resource, and loading the selected into a runtime system. The attributes may include an archive name, an upload time, a package name, a checksum, a development flag, and/or a user name. By utilizing this technique, end-user or development sessions operative on application servers have the capability to use multiple different versions of classes in runtime environments without interfering with other operative sessions.

22 Claims, 9 Drawing Sheets

| javaload | |
|---|---|
| Column Name | Condensed Type |
| id | char(32) |
| classname | char(100) |
| jarname | char(30) |
| state | char(1) |
| uploadtime | char(17) |
| packagename | char(100) |
| unam | char(12) |
| checksum | char(32) |
| length | int |
| data | image |
| | |

STORING AND USING CLASSES IN DATABASES

BACKGROUND

The present application relates to digital data processing, and more particularly to storing and using classes in databases.

FIG. 1 illustrates a client/server system 50 in which a network 75 links a server 80 to client systems 60A, 60B, 60C. The server 80 is a programmable data processing system suitable for implementing apparatus, programs, or methods. The server 80 provides a core operating environment for one or more runtime systems that process user requests. The server 80 includes a processor 85 and a memory 90. The memory 90 can be used to store an operating system, a Transmission Control Protocol/Internet Protocol (TCP/IP) stack for communicating over the network 75, and machine-executable instruction code executed by the processor 85. In some implementations, the server 80 can include multiple processors, each of which can be used to execute machine-executable instructions. An example of a suitable server that can be used in the client/server system 50 is a JAVA 2 PLATFORM ENTERPRISE EDITION™ (J2EE) compatible server, such as the Web Application Server developed by SAP AG of Walldorf (Baden), Germany (SAP), or the WebSphere Application Server developed by IBM Corp. of Armonk, N.Y.

Client systems 60A, 60B, 60C can execute multiple applications or application interfaces. Each instance of an application or an application interface can constitute a user session. Each user session can generate one or more requests to be processed by the server 80. The requests can include instruction code to be executed on a runtime system (e.g., the virtual machine 100) on the server 80.

A runtime system is a code execution environment that executes instruction code in user requests and that provides runtime services for that code. Core runtime services can include functionality such as process, thread, and memory management (e.g., laying out objects in the server memory 90, sharing objects, managing references to objects, and garbage collecting objects). Enhanced runtime services can include functionality such as error handling and establishing security and connectivity.

One example of a runtime system is a virtual machine. A virtual machine (VM) is an abstract machine that can include an instruction set, a set of registers, a stack, a heap, and a method area, like a real machine or processor. A VM essentially acts as an interface between program code and the actual processor or hardware platform on which the program code is to be executed. The program code includes instructions from the VM instruction set that manipulates the resources of the VM. The VM executes instructions on the processor or hardware platform on which the VM is running, and manipulates the resources of that processor or hardware platform, so as to effect the instructions of the program code. In this way, the same program code can be executed on multiple processors or hardware platforms without having to be rewritten or re-compiled for each processor or hardware platform. Instead, a VM is implemented for each processor or hardware platform, and the same program code can be executed in each VM. The implementation of a VM can be in code that is recognized by the processor or hardware platform. Alternatively, the implementation of a VM can be in code that is built directly into a processor.

As an example, a JAVA™ source program can be compiled into program code known as bytecode. Bytecode can be executed on a Java VM running on any processor or platform. The Java VM can either interpret the bytecode one instruction at a time, or the bytecode can be further compiled for the real processor or platform using a just-in-time (JIT) compiler.

In addition to Java VMs, other examples of VMs include Advanced Business Application Programming language (ABAP) VMs and Common Language Runtime (CLR) VMs. ABAP is a programming language for developing applications for the SAP R/3 system, a widely installed business application system developed by SAP. The Common Language Runtime is a managed code execution environment developed by MICROSOFT® Corp. of Redmond, Wash. For purposes of simplicity, the discussion in this specification focuses on virtual machines, but it is to be understood that the techniques described herein can also be used with other types of runtime systems.

A VM typically begins execution by invoking a method of a specified class. This invocation causes the specified class to be loaded, linked to other types that it uses, and initialized. The VM will typically check first to determine if the class has already been loaded. For example, the VM may have previously loaded the class into a local cache area. If not, however, the VM will use a class loader to attempt to find the class, which is represented in binary form. A class loader extends the way in which the VM dynamically loads and creates the class in a platform-specific manner. For example, a VM running in one hardware or software environment may load the class differently than a VM running in a different hardware or software environment.

The class loader may be a bootstrap class loader supplied by the VM or a user-defined class loader. The bootstrap class loader is responsible for loading basic class library classes. The VM may also have access to other types of class loaders. The user-defined class loader can be used to create a class that originates from user-defined sources. The VM often uses a special variable, referred to as a "class path" variable, to locate classes for loading. For example, the user-defined class loader may utilize the class path variable to locate user-defined classes. The class path variable may specify various file directories in which the VM is to look for classes. Multiple classes are often archived and stored in these file directories. For example, in JAVA environments, JAVA archives (JAR's) may be stored in these directories. The JAR's may include multiple classes in compiled form, along with other information associated with these classes.

Once the VM has loaded a given class, it then links the class to other types (e.g., classes or interfaces) that it uses. Linking is the process of taking a binary form of a class or interface type and combining it into the runtime state of the VM so that it can be executed. Linking typically involves verification, preparation, and resolution of symbolic references. Finally, after the VM has loaded and linked the class, it may initialize the class by executing any class variable initializers and static initializers. In certain contexts, the term "loading" or "class loading" may refer to the combined processes of loading, linking, and initialization of classes.

SUMMARY

Various implementations provide methods and apparatus, including computer program products, that implement techniques for storing and using resources, such as classes, in databases.

One implementation provides a technique for receiving a specified name, retrieving one or more resources from a database, and for each resource, one or more attributes associated with the resource, wherein each resource comprises executable instruction code, and wherein the attributes include a name that matches the specified name. The technique further provides for selecting one of the retrieved resources based on the attributes associated with each resource, and loading the selected resource into a runtime system. The attributes may include an archive name representing a logical archive with which the resource is associated, an upload time representing the time at which the resource was stored in the database, a package name representing a package of which the resource is a part, a checksum computed on the resource, a development flag representing whether the resource is a development resource, and a user name representing a developer to whom the resource belongs.

In one implementation, a technique is provided for receiving a list identifying one or more resources to be stored in a database, reading the identified resources, and, for each resource of the identified resources, computing one or more attributes based on metadata associated with the resource, and storing the resource and its attributes in a separate record in the database. Each resource comprises executable instruction code. In addition, the technique may further provide for identifying multiple versions of a resource in the database, identifying an oldest user session that is using the resource, identifying a version of the resource that has been loaded by the oldest user session (the version of the resource being one of the multiple versions of the resource in the database), and deleting all the versions of the resource in the database whose associated upload time is older than the upload time associated with the version of the resource that has been loaded by the oldest user session.

The techniques described in this specification can be implemented to realize one or more of the following advantages. For example, in one implementation, classes can be loaded by class loaders that are capable of retrieving classes from a common database. The classes inside the database may be grouped into "virtual JAR" archives, allowing the use of class path variables when these classes are stored in a database. In one implementation, classes that are stored in the database also have associated attributes to provide version information and optional developer information. As such, multiple class versions can be stored in the database, including special versions available only to and accessible by developers who are able to test and use these special versions in a runtime environment. An attribute specifies whether classes are development class versions or official class versions. To reduce space consumption in the database, the classes may also be compressed when initially stored, and are later decompressed during the class loading process. A checksum attribute may also used to verify the integrity of the stored classes.

One implementation provides all of the above advantages.

In setups with multiple application servers, the deployment of classes to a database and loading of the classes from the database may provide additional advantages. Storing classes in a file system typically requires keeping applications that are deployed locally on the servers in synchronization. This can make the deployment difficult, and servers that are still using outdated versions of an application in a cluster can cause problems. By keeping all classes in one central database that is coupled to the application servers, these servers have access to the classes in a centralized manner.

In addition, the transactional behavior of database servers can be used to improve the deployment of applications. In file system based deployments, inconsistent states can occur when one file after the other is copied to disk. A failure during the deployment may render the application unusable because the classes in the file system will not often be in a consistent state. Using a database allows transactional updates of applications. The installation or update is performed in an atomic step that completely fails or succeeds, which provides for a consistent state of the deployed application.

The ability to associate additional attributes with each class in the database offers different "views" to the deployed classes. As already explained above, developers can have private views, and different class versions can be maintained. The capability of the attributes is not limited to this use case but can be used for any purpose that provides for a selection classes by special attributes.

These general and specific aspects can be implemented using a computer program, a method, a system or apparatus, or any combination of computer programs, methods, or systems. Details of one or more implementations are set forth in the accompanying drawings and in the description below. Other features, objects, and advantages will be apparent from the description, the drawings, and the claims.

BRIEF DESCRIPTION OF THE DRAWINGS

FIG. 7 is a screen diagram of a table that may be stored in the database shown in FIG. 5, according to one implementation.

Like reference numbers and designations in the various figures indicate like elements.

DETAILED DESCRIPTION

Figure 1:
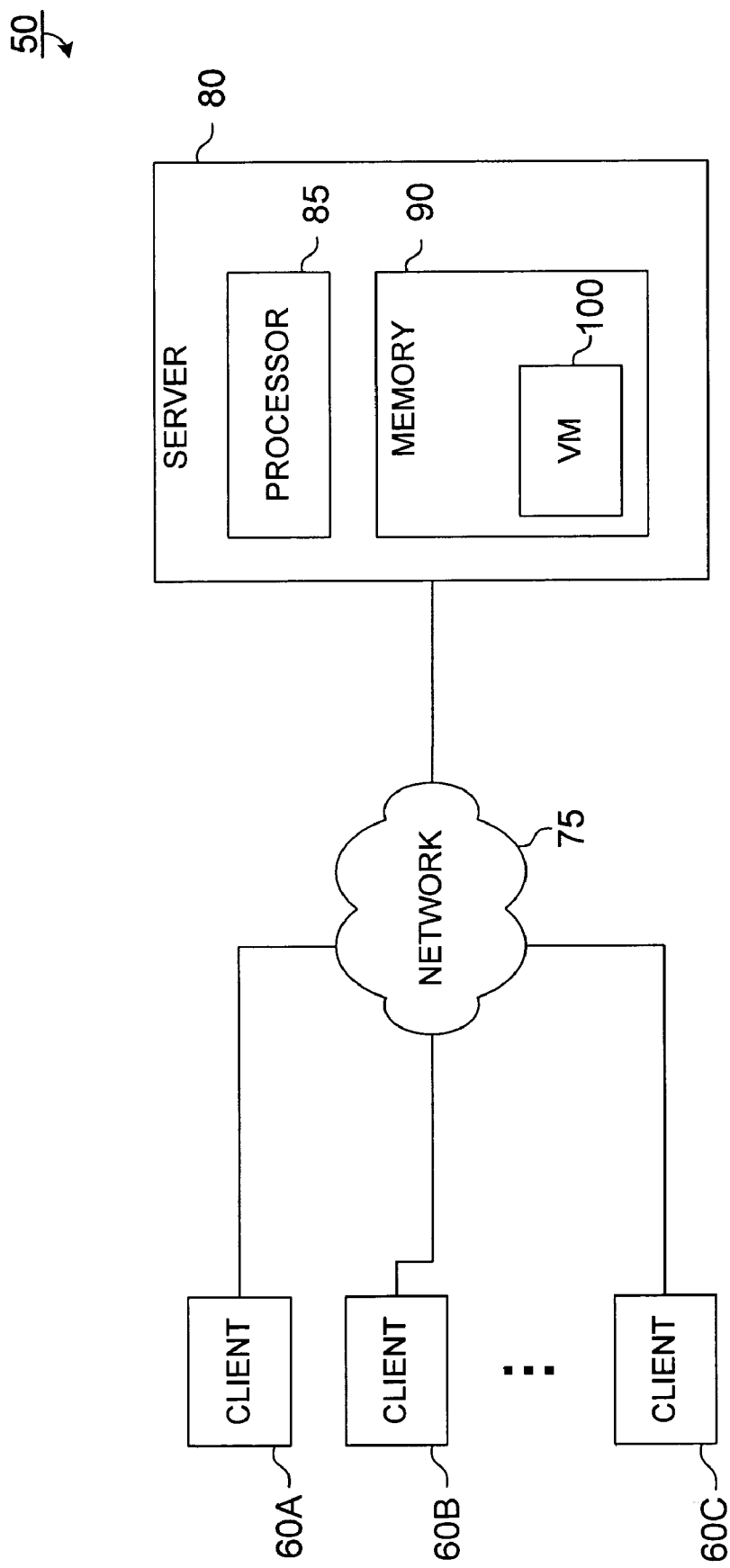
FIG. 1 is a block diagram of a client/server system.
Figure 2:
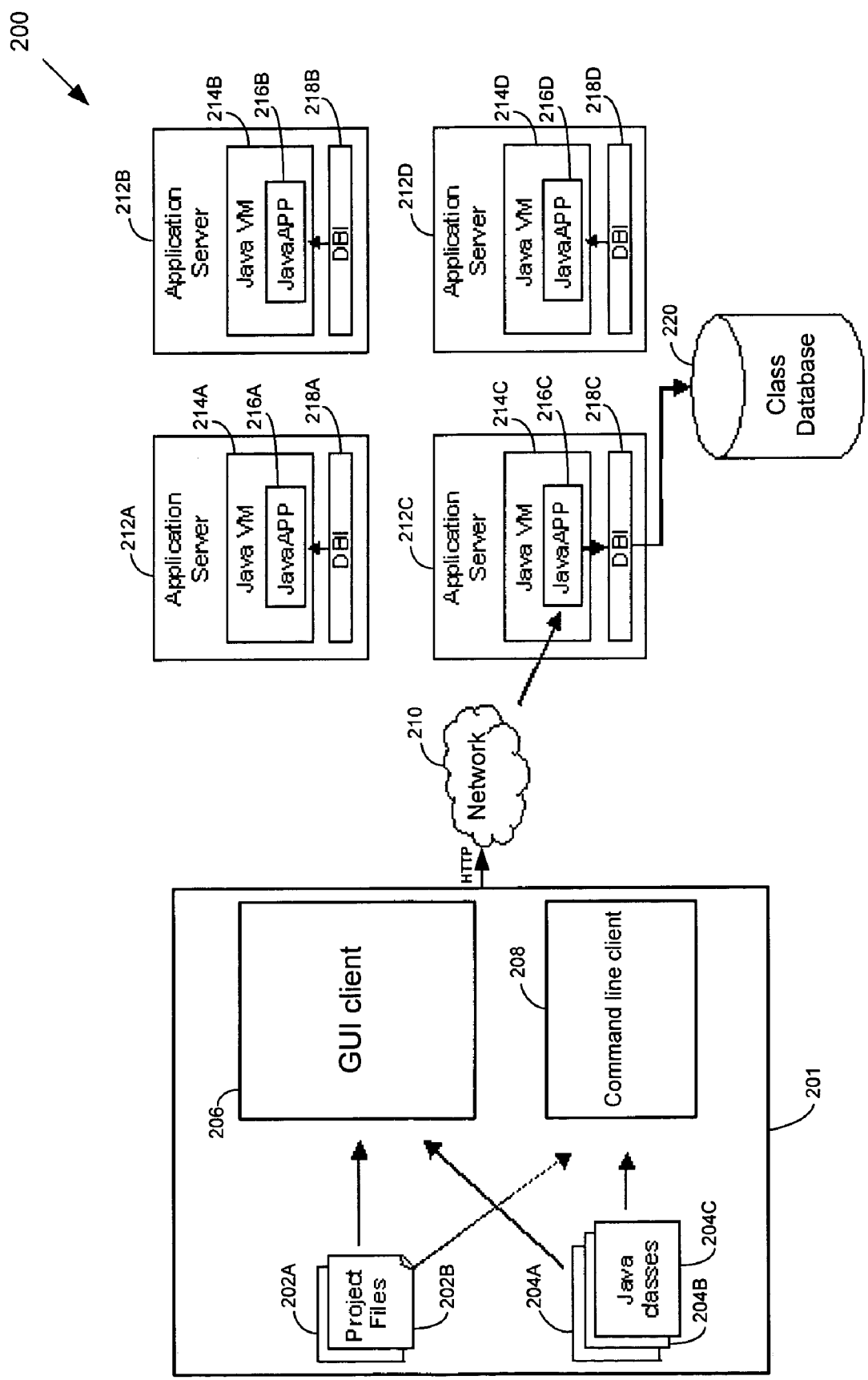
FIG. 2 is a block diagram of a system that may be used for storing resources, such as classes, in a database, according to one implementation.

FIG. 2 is a block diagram of a system 200 that may be used for storing resources, such as object classes, in a class database 220, according to one implementation. The system 200 provides an architectural environment in which these object classes may be deployed for use at runtime. In one implementation, these object classes are deployed for use in object-oriented runtime environments provided by the application servers 212A-D. Each of these application servers 212A-D may load and use classes that have been deployed and stored in the class database 220. In one implementation, the application servers 212A-D may load different versions of classes that have been stored within the database 220, as will be described in more detail below.

As shown in FIG. 2, the system 200 includes a deployment client 201, a network 210, the application servers 212A-D, and the database 220. In one implementation, the network 210 comprises an Internet-based network. The deployment client 201 sends requests to one or more of the application servers 212A-D to add one or more classes 204A-C to the database 220. Typically, the classes 204A-C will contain binary representations of compiled source code, such as JAVA source code. A programmer or automated process may create the source code that is then compiled to generate the classes 204A-C. The classes 204A-C are typically stored as files in file directories on the deployment client. In certain instances, one or more files may be packed together in one archive file, such as a JAVA archive (JAR) file. The deployment client 201 is capable of deploying any of the files or information contained within JAR files for later storage within the database 220. These JAR files may include property files, image data, etc., in addition to class information in binary, or compiled, format. In one implementation, information contained in JAR files provided by the deployment client 201 is stored in one or more database tables within the database 220. These tables can also include meta information, or attribute information, that is associated with classes. The meta information can be associated with any kind of data (e.g., images) that is stored within the database 220.

The deployment client 201 also includes project files 202A-B. The project files 202A-B specify which of the classes 204A-C are to be deployed and stored within the database 220 for a given project. These project files 202A-B may be manually or automatically generated based upon input that is provided by a user. Different project files may specify different classes, or sets of classes, that are to be deployed during different intervals. The use of the files 202A-B provides a great deal of flexibility in configuring class deployment.

Figure 4:
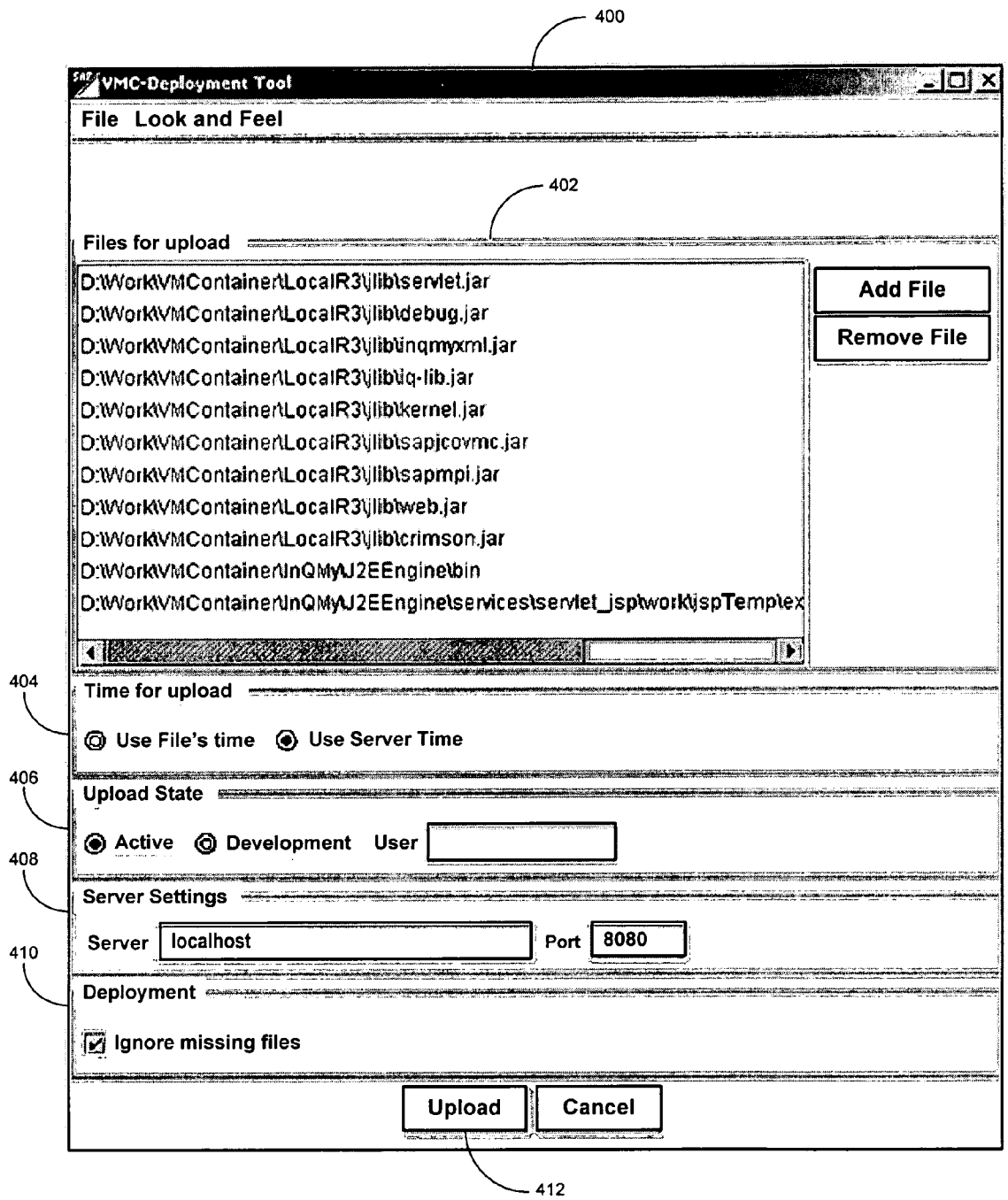
FIG. 4 is a screen diagram of a window provided by the graphical user interface (GUI) client shown in FIG. 2.

As shown in FIG. 2, the deployment client 201 provides both a graphical user interface (GUI) client 206 and a command-line client 208. In some implementations, other types of interfaces or command-line tools may also be used by the deployment client 201. The project files 202A-B and the JAVA classes 204A-C are provided as input to both the GUI client 206 and the command-line client 208. The GUI client 206 provides a user with a graphical representation of the information contained within the project files 202A-B and information about the JAVA classes 204A-C. The user may use the GUI client 206 to modify the deployment details of the classes that are to be stored within the database 220. For example, the user may use the GUI client 206 to modify the list of classes that are to be deployed, the time of deployment, etc. Further details of the GUI client 206 are shown in FIG. 4 and described in more detail below. Alternatively, the user may use the command-line client 208 to deploy classes. Typically, the user will use the command-line client 208 to invoke a predefined user script that specifies deployment details of the classes that are to be stored within the database 220. The predefined user script contains information about the classes 204A-C and information provided by the project files 202A-B. The user may use a textual editor to modify the details of the predefined user script rather than modifying these details using the GUI client 206. The user will normally choose either the GUI client 206 or the command-line client 208 to deploy classes.

The deployment client 201 sends Hypertext Transfer Protocol (HTTP) requests over the network 210 to one or more of the application servers 212A-D to deploy classes in the database 220. The example of FIG. 2 shows requests being sent to the application server 212C. In other implementations, different forms of transfer protocols may be used. Each application server 212A-D contains a corresponding virtual machine (VM) 214A-D, a corresponding application 216A-D, and a corresponding database interface (DBI) 218A-D. Each VM 214A-D is capable of executing multiple applications in addition to the applications 216A-D. Although shown as JAVA VM's, the VM's 214A-D may also be Common Language Runtime (CLR) VM's or other types of VM's in alternate implementations.

In the example shown in FIG. 2, the application 216C may be a servlet application, such as a JAVA servlet application. The application 216C processes the HTTP requests provided by the deployment client 201 and stores the specified classes within the database 220 using the DBI 218C. The HTTP requests include the class information that is to be stored in the database 220. In one implementation, the classes are stored within the database 220 in compressed form to save storage resources. In this implementation, the DBI 218C manages the class compression operations. The database 220 is a JAVA Database Connectivity (JDBC) compliant data source, and the DBI 218C provides a JDBC-compliant interface. In alternate implementations, the DBI 218C provides an alternate, non-JDBC interface.

Figure 3:
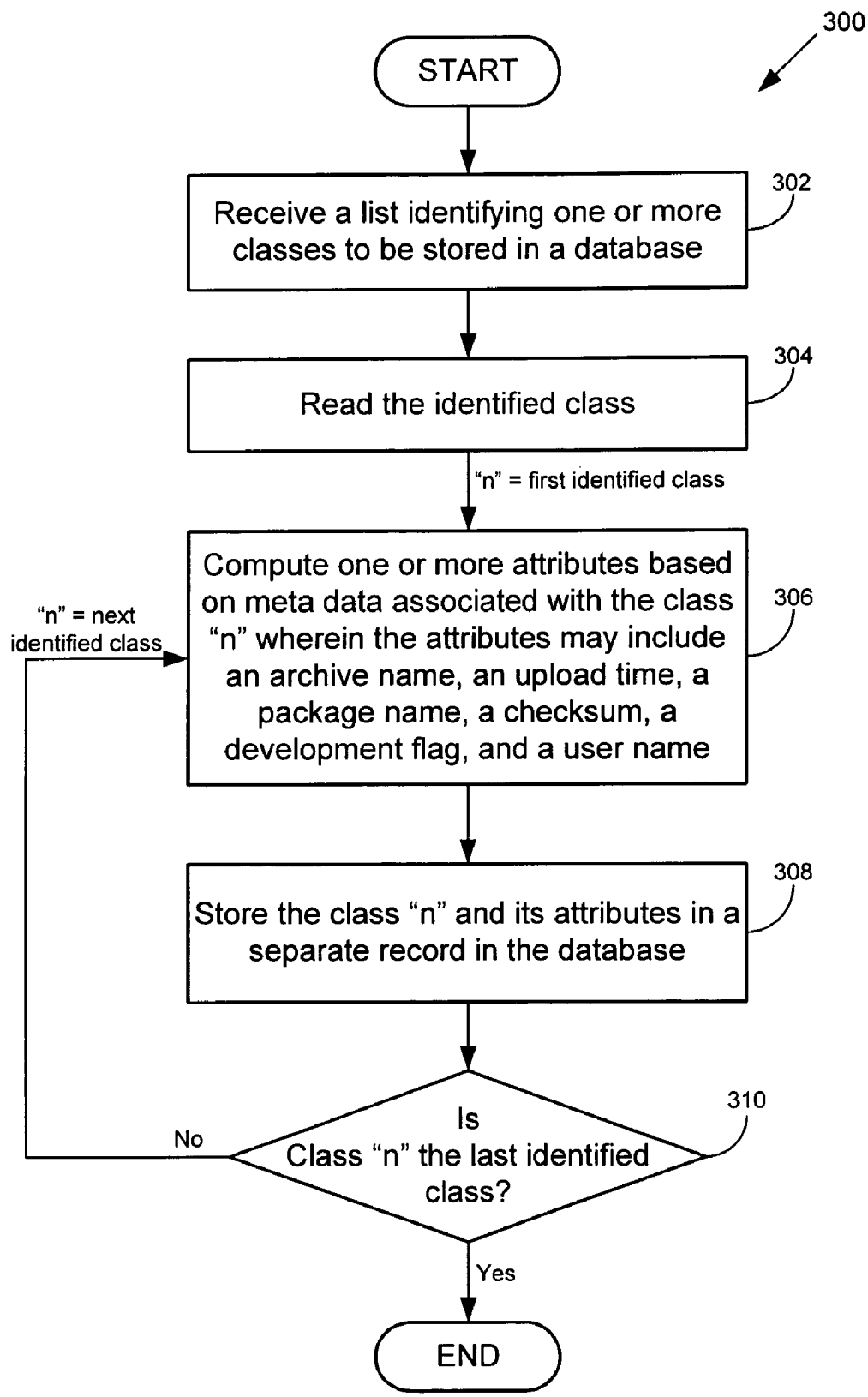
FIG. 3 is a flow diagram of a method that may be performed by one or more of the application servers shown in FIG. 2 for class deployment.

FIG. 3 is a flow diagram of a method 300 that may be performed by one or more of the application servers 212A-D shown in FIG. 2 for class deployment. The method 300 includes acts 302, 304, 306, 308, and a checkpoint 310. In the act 302, one of the application servers, such as the server 212C shown in FIG. 2, receives a list from the deployment client 201 identifying one or more of the classes 204A-C to be stored in the database 220. The list is provided in one or more HTTP requests that are sent from the deployment client 201. In the act 304, the one application server 212C reads the identified classes. In one implementation, the application server 212C determines whether any of the identified classes are included in an archive. For example, one or more of the identified classes may have originally been included within a JAVA archive (JAR) file when stored on the deployment client 201. If any of the identified classes are included in an archive, the application server 212C unpacks the archive before storing the classes in the database 220. In one implementation, the application 216C is a servlet application that unpacks the archive.

For every class that is identified, the application server 212C performs the acts 306 and 308 and uses the checkpoint 310 to store the class in the database 220. In the act 306, the application server 212C computes one or more attributes based on metadata associated with the identified class. The metadata is provided by the deployment client 201. The attributes may include an archive name, an upload time, a package name, a checksum, a development flag, and a user name. The archive name represents a logical archive with which the class is associated. For example, if the class was contained within a JAR on the deployment client 201, the archive name may substantially match the name of the JAR file. The deployment client 201 may provide the name of the JAR file to the application server 212C as metadata.

The upload time represents the time at which the class is being stored in the database 220. The package name represents a package of which the class is a part. For example, the class may be a part of a package that includes other associated classes. The checksum is a value that is computed on the class. The checksum can then later be verified during the class loading process when one of the application servers 212A-D tries to determine if the class is valid before use at runtime. The development flag represents whether the class is a development class. The user name represents a developer to whom the class belongs. A development class is one that is to be later loaded and used by a developer rather than an end-user, such as a customer. For example, a developer working on one of the application servers 212A-D may wish to use one or more development classes at runtime that are stored within the database 220 without affecting the runtime uses of end-user classes that are also stored within the database 220. The storage of various different versions of classes within the database 220 will be described in further detail below.

In the act 308, the application server 212C stores the class and its attributes in a separate record in the database 220. The database 220 is capable of holding multiple records for the various classes that are to be stored. In one implementation, the database 220 is a relational database. The application server 212C uses the DBI 218C when interfacing with the database 220. For example, the DBI 218C may send requests to the database 220 in formats that are recognizable to the database 220. To save storage space, either the application server 212C or the database 220 may compress each class before storing the class in the database 220.

At the checkpoint 310, the application server 212C determines whether it has finished processing all of the identified classes. The application server 212C continues processing until each of the identified classes has been stored in the database 220. Once the classes have been stored, they may later be loaded and used at runtime by one or more of the VM's 214A-D.

FIG. 4 is a screen diagram of a window 400 provided by the graphical user interface (GUI) client 206 shown in FIG. 2. A user of the deployment device 201 may use the window 400 provided by the GUI client 206 when specifying the classes that are to be deployed and stored within the database 220, and also when providing additional meta information about the classes and any other uploaded resources. The GUI client 206 allows easy creation and modification of deployment projects. The user may alternatively use the command-line client 208 to invoke preconfigured scripts that specify class deployment and class meta information. The user may choose to the command-line client 208 when executing batch jobs on the deployment client 201.

The window 400 contains window areas 402, 404, 406, 408, and 410, and also contains a button 412. The window area 402 contains a list of files that are to be uploaded to one or more of the application servers 212A-D. These files may contain individual classes or groups of classes in binary (or compiled) form. For example, certain files may be JAR files that contain multiple classes and possible additional information. As shown in the example of FIG. 4, the window area 402 displays the file directory locations for each of the files that are provided on the deployment client 201. JAR files typically have a file-name suffix of ".jar". The user may select the "add file" button to add files to the displayed list, and may select the "remove file" button to remove files from the list. In one implementation, the deployment client 201 is capable of providing the application servers 212A-D with the name of JAR files as meta information that is associated with corresponding classes.

The window area 404 contains settings that specify the time for upload that is provided as meta information to the application servers 212A-D. The servers are capable of storing the upload time as an attribute within the database 220. The selected setting shown in the window area 404 specifies the upload time that is to be provided. For example, if the user selects the "use file's time" radio button, the deployment client 201 will provide meta information for the upload time that corresponds to the time for an individual file shown in the window area 402. This time may correspond to the time of file creation on the deployment client 201 or the time of last modification of the individual file. On the other hand, if the user selects the "use server time" radio button, the upload time is provided by the application server upon storage of the classes within the database 220. The user selection of one of the radio buttons within the window area 404 is applied when uploading classes to the application servers 212A-D. In one implementation, all classes that are, for example, listed in the window area 402, or that are deployed in a given deployment cycle, will be stored in the database 220 with a common upload, or deployment, time. If, for example, each of these classes are part of a class version set (e.g., "version 1" of multiple different classes), each class in the set will share a common upload time.

The window area 406 contains settings for an upload state. The upload state is also provided as class meta information to the application servers 212A-D. As shown in FIG. 4, the user may either select the "active" state radio button or the "development" state radio button. If the user selects the "active" button, the one or more classes that are uploaded will have an associated state of "active", meaning that the classes are active and official class versions. In certain circumstances, there can be many different versions of an individual class that are each considered official versions. However, newer official versions may include various attributes or methods that are modified from older official versions of the same class. In addition, the newer official versions may include new attributes or methods no present in the older official versions. Because the VM's 214A-D load and use classes that are stored in the database 220 dynamically (when they are needed for application execution), and because the deployment client 201 is capable of uploading classes to the database 220 dynamically, the database 220 often stores these various different official versions of classes. For example, the VM 214A may load and use a first official version of a class that is stored in the database 220 at a time "t". At a time "t+1", the deployment client 201 deploys a second official version of the class that is stored in the database 220. The application 216A operating in the VM 214A, however, will continue to use the first official version of the class that was previously loaded and that is still stored in the database 220. When the application 216A dynamically loads a version of the class at the time "t+1", it will get the first official version of the class that was uploaded at the time "t". This implementation allows the application 216A to see a consistent version of the class. Another VM, such as the VM 214B on the application server 212B, may load and use the second official version of the class after it has been deployed and stored in the database 220.

The database 220 may also store development, unofficial versions of classes. These unofficial class versions are not available to, or accessible by, end-user sessions or applications running on the servers 212A-D. Instead, the unofficial class versions are available to and accessible by development applications provided by one or more of the VM's 214A-D. Developers may use these development applications to load, use, and test the unofficial class versions in the runtime environments provided on the servers 212A-D. In this fashion, the developers may find great benefit in having the ability to load, use, and test unofficial class versions that are stored in the database 220 concurrently with other official class versions.

Referring again to the window area 406 shown in FIG. 4, the user may select the "development" radio button to specify that the classes contained in the listed files are development, or unofficial classes that are to be stored in the database 220. The user may also use the text-entry field within the window area 406 to specify a specific developer's name. The developer's name is then provided as meta information during deployment and can be stored as an attribute within the database 220. Only a developer whose name is associated with a class that is stored in the database 220 may use one of the servers 212A-D to load and use an unofficial version of that class. If there is no specific name associated with the class, then any developer may use the servers 212A-D to load and use an unofficial version of the class.

The window area 408 contains information about server settings. Typically, the deployment client 201 uploads class information to one application server at a time. The name of the one application server is specified by the user in one text-entry field (within the window area 408), and a server port number may also be specified in another text-entry field. The port number may, for example, be a Transmission Control Protocol (TCP) port number on one of the application servers 212A-D. In another implementation, the deployment client 201 has the capability to upload class information to multiple servers in a substantially concurrent fashion. In this implementation, the window area 408 would contain additional text-entry fields (not shown) into which the user could enter the names and port numbers of additional application servers.

In the window area 410, the user may select the checkbox to indicate a preference to ignore missing files during deployment. The GUI client 206 is used to create project files for classes that are to be uploaded, according to one implementation. An application may comprise a series of classes and/or archives and is represented by a project file. In automated builds, the project file is used to upload classes and other resources using the command-line client 208. The "ignore missing files" flag determines whether or not the upload operations should stop and roll back the upload transaction if one of the class or archive files configured in the project file is missing. In most situations, a user would want to stop the upload and roll back the transaction if a file is missing, because this will help guarantee a consistent application state in the database 220. In certain situations, however, it may make sense to ignore missing files (e.g., if the user wants to upload only a few changes to an application). Here, ignoring the missing files allows the user to upload the changes using the same project file that has been created for the whole application.

When the user has finished providing input and making selections within the window area 402, 404, 406, 408, and 410, the user may select the button 412. Upon user selection of the button 412, the deployment client 201 will deploy the classes that are to be stored in the database 220. In doing so, the deployment client 201 will directly interact with an servlet application running on one of the application servers 212A-D.

Figure 5:
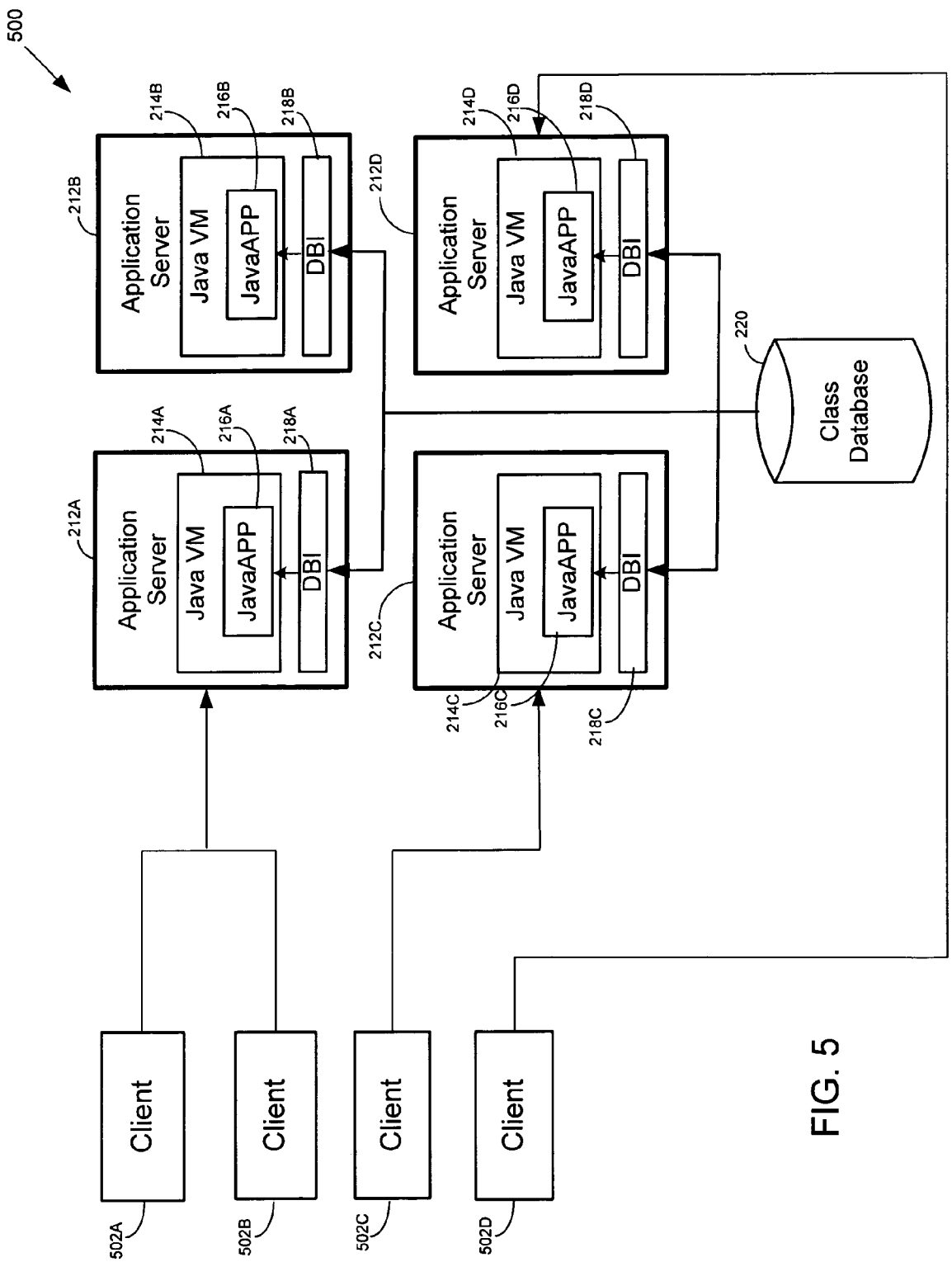
FIG. 5 is a block diagram of a system that may be used for accessing and using resources, such as classes, that are stored in a database, according to one implementation.

FIG. 5 is a block diagram of a system 500 that may be used for accessing and using resources, such as classes, that are stored in the database 220, according to one implementation. The system 500 provides a view of a runtime environment in which the VM's 214A-D load and use classes that have been previously deployed and stored in the database 220. At runtime, various clients 502A-D may interact with and send requests to the application servers 212A-D. As shown in FIG. 5, the clients 502A and 502B interact with the application server 212A, the client 502C interacts with the application server 212C, and the client 502D interacts with the application server 212D. The clients 502A-D are capable of sending requests of many different forms to the application servers 212A-D. For example, the clients 502A-D may request that one or more of the application servers 212A-D perform specific computing actions or operations within the runtime environment.

When becoming operational in the runtime environment, or when receiving specific requests from the clients 502A-D, the application servers 212A-D may need to access the database 220 using corresponding database interfaces 218A-D. Specifically, the VM's 214A-D may need to load classes (using correspond class loaders) from the database 220 for use by the applications 216A-D during execution. Typically, the VM's 214A-D will utilize user-defined class loaders for the classes stored in the database 220. Because classes are stored in a centralized location, the VM's 214A-D can make use of the same executable code provided by these classes. However, although the VM's 214A-D may have access to a common class that is stored in the database 220, they may not load this class for use at the same time. For example, the VM 214A may load a class "A" at a first point in time when it is needed for execution, while the VM 214B may load the class "A" at a second, subsequent point in time. Because various different class versions may have been previously deployed and stored within the database 220, the VM's 214A and 214B may load distinct versions of class "A".

In one implementation, class versions that are stored within the database 220 each have an associated attribute indicating when that particular class version was uploaded and stored within the database 220. Over time, various different versions of a class may be stored in the database 220. When one of the VM's 214A-D needs to load a class, it will identify the time at which the user content, or session, for the corresponding application 216A-D was started. The VM 214A, 214B, 214C, or 214D then identifies all class versions in the database 220 that are older than user session (i.e., that were uploaded to the database 220 before the user session was started). The VM 214A, 214B, 214C, or 214D then loads the most recent of these identified class versions. During execution, the VM will continue to use the same version of the class that was previously loaded. Since the VM's 214A-D may start user sessions for the applications 216A-D, the VM's 214A-D may load different class versions. In addition, updated class versions can be dynamically deployed into the database 220 without disturbing other running user sessions. Developers can also initiate applications that load and use unofficial versions of classes without interfering with other applications.

In one implementation, one or more of the application servers 212A-D periodically identify an oldest user session that is using a class having multiple versions that are stored in the database 220. This user session may correspond to one of the applications 216A-D that executes during runtime. One or more of the servers 212A-D then identify a version of the class that has been loaded by the oldest user session, and delete all the versions of the class in the database 220 whose associated upload time is older than the upload time associated with the version of the class that has been loaded by the oldest user session. In this fashion, the unused and obsolete versions of the class may be periodically removed from the database 220.

Figure 6:
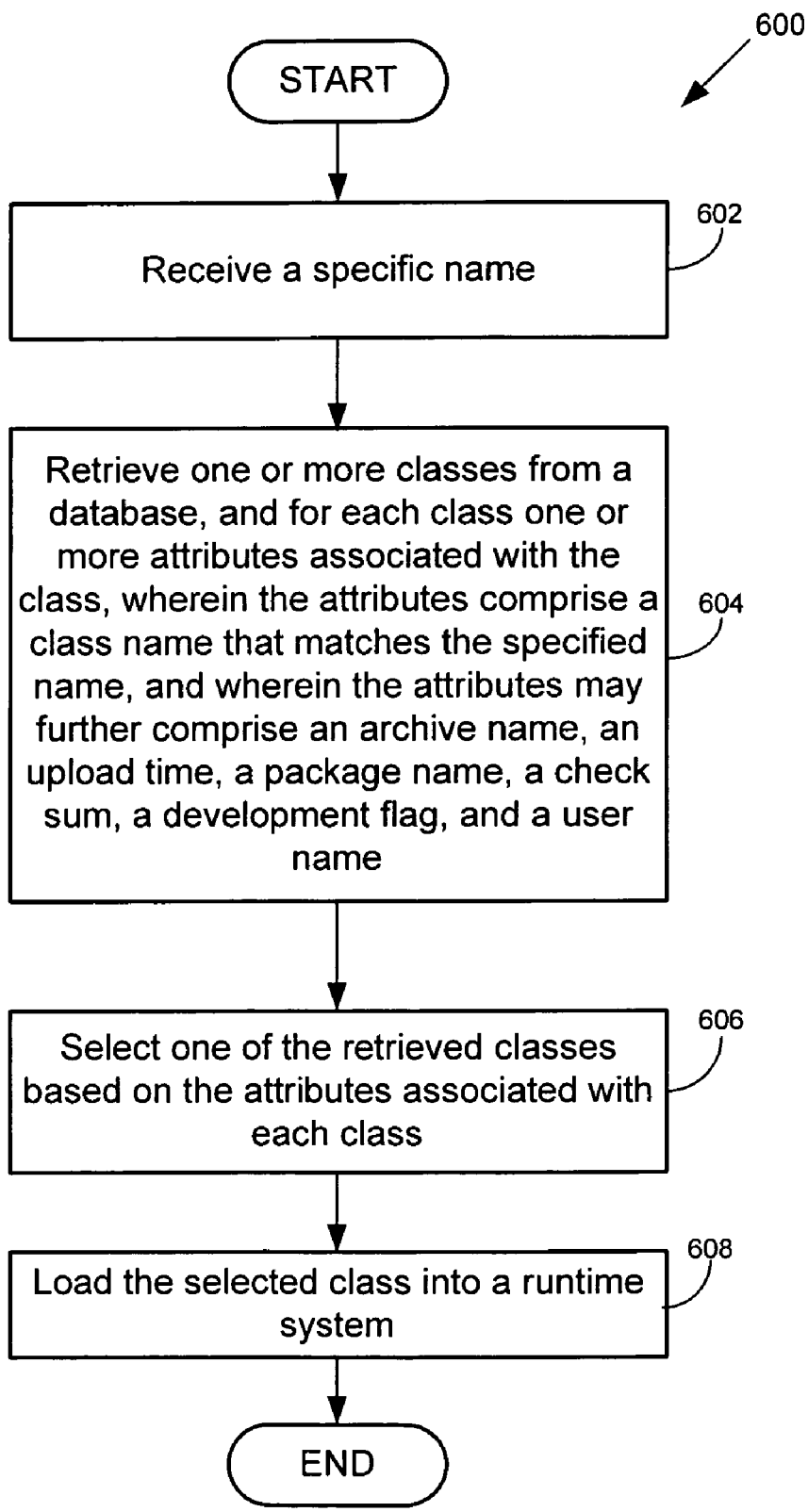
FIG. 6 is a flow diagram of a method that may be performed by one or more of the virtual machines (VM's) shown in FIG. 5 for class loading.

FIG. 6 is a flow diagram of a method 600 that may be performed by one or more of the VM's 214A-D shown in FIG. 5 for class loading. The method 600 includes acts 602, 604, 606, and 608. In the act 602, a VM, such as the VM 214A, receive a specified class name. The VM 214A may receive the class name from one of the clients 502A-D or from an invocation parameter provided by the server 212A during startup of the application 216A. When the VM 214A receives the specified class name, it then retrieves one or more versions of a class from the database 220 in the act 604. Each retrieved class version has one or more associated attributes, wherein one such attribute is a class name that matches the specified name. To retrieve the one or more class versions, the VM 214A passes the specified class name as an input parameter in a database command that is sent to the database 220 through the DBI 218A, according to one implementation. The database 220 then provides the VM 214A with the one or more corresponding class versions, wherein each version has an associated class name that matches the class name.

In one implementation, the database 220 stores classes in a compressed format to save storage space. In this implementation, the classes are decompressed when they are loaded by a VM, such as the VM 214A.

Each retrieved class version also may be associated with additional attributes, such as an archive name, an upload time, a package name, a checksum, a development flag, a user name, and an archive name representing a logical archive with which the class is associated. The upload time represents the time at which the class version was stored in the database 220. The package name represents a package of which the class version is a part. The checksum is a value that is computed on the class version and that may be used to validate the integrity of the version as it is loaded from the database 220. The development flag represents whether the class version is a development (or unofficial) class version, and the user name represents the name of the developer to whom the class version belongs. As described previously, developers may store development, or unofficial, class versions within the database 220 that may be later used in the runtime environment provided by the system 500. FIG. 7, described below, provides an example of these attributes.

In the act 606, the VM 214A selects one of the retrieved class versions based on the attributes associated with each class version. In one implementation, the VM 214A receives a specification of a class path and identifies one of the retrieved classes whose archive name appears first in the class path. As described previously, object classes may originally be stored in JAR files on the deployment client 201, shown in FIG. 2, before they are deployed and stored in the database 220. In this case, the deployment client 201 may provide, as meta information, the name of these JAR files, which can then be stored as attribute information within the database 220. For example, a particular class (or version of a class) "A" may have been originally stored in a JAR file "/classes/version1/java_classes.jar" on the deployment client 201. Classes that are part of a first deployment version may be stored in the "/classes/version1/" directory. The class "A" is then deployed and stored individually within the database 220. Upon storage, an associated archive name attribute will also be stored in the database 220. Classes having the same archive name attribute can be considered to be part of a common, "virtual JAR" archive.

In one example, the value of the archive name attribute is "java_classes.jar". Every other class originally contained within the "java_classes.jar" JAR file on the deployment client 201 will have an associated archive name attribute stored in the database 220 that has a value of "java_classes.jar". In this fashion, the VM 214A can, at runtime, still make use of class path variables. Typically, a class path will include a sequential list of file directories or file names that are to be sequentially traversed when searching for classes. The VM 214A is capable of processing a class path variable and identifying a class whose associated archived name attribute appears first in the class path. Thus, if the VM 214A has retrieved a set of classes, and if "java_classes.jar" appears first in the class path, the VM 214A will select class "A". In certain scenarios, the JAR file name will reflect a version number (e.g., "java_classes_v1.jar").

In another example, the value of the archive name attribute is the full path name "/classes/version1/java_classes.jar". Thus, in this example, the VM 214A may retrieve from the database 220 multiple versions of the class "A". For instance, the VM 214A may retrieve three classes that are each different versions of the class that is named "A". The corresponding archive name attributes of these retrieved classes may be as follows: "/classes/version1/java_classes.jar"; "/classes/version2/java_classes.jar"; and "/classes/version3/java_classes.jar". (Each of the classes were originally contained within separate JAR files on the deployment client 201 before being deployed and stored in the database 220). The VM 214A can then make use of the class path variable to select the appropriate class version. The class path variable may be set as follows: "CLASSPATH=/classes/version1/java_classes.jar; /classes/version2/java_classes.jar; /classes/version3/java_classes.jar". When the class path variable is set as such, the VM 214A will select the version of the class named "A" that has the associated archive name attribute of "/classes/version1/java_classes.jar", since this is the first name listed in the class path.

In one implementation, the act 606 includes receiving a specification of a start time associated with a user session executing in the runtime environment. For example, the VM 214A may receive a specification of a start time of a user session for the application 216A executing within the runtime environment. The VM 214A is able to track the start times for any such sessions invoked by the application 216A for various users, such as end-users or developers who wish to use the VM 214A for runtime operations. The VM 214A then sorts the retrieved classes by the value of the upload time attribute that is associated with each of the retrieved classes. The VM 214A then identifies one of the retrieved classes whose upload time is older than and closest to the start time associated with the user session. In this fashion, the VM 214A selects the most recent version of a class that was uploaded to the database 220 before the user session was initiated.

In one implementation, the act 606 includes determining if a session executing in the runtime environment is associated with a specific developer. For example, the VM 214A may determine if a session for the application 216A is associated with a specific developer. When the session is initiated, the VM 214A may be provided with a developer's name as an input or command parameter. In another scenario, the VM 214A may use a lookup table to determine if the session is associated with a specific developer. If the session is associated with a developer, the VM 214A identifies one or more of the retrieved classes whose development flag attribute is set. If the development flag attribute for a class is set, the class was deployed as a development class (i.e., a development version of the class).

In one implementation, the act 606 includes receiving a specification of a name associated with the session. This name can be provided directly by the session to the VM, such as the VM 214A. If the session is associated with a developer, the VM 214A identifies one or more of the retrieved classes whose associated user name matches the name associated with the user session. In this fashion, the VM 214A can identify unofficial, or development, versions of classes that have been associated with specific developers when deployed into the database 220. These developers are then able to load and use these classes in the runtime environment provided by the VM 214A.

Finally, in the act 608, the VM 214A loads the selected class version into a runtime environment provides by the VM 214A. Upon linking and initialization, the class version is then available for use in the runtime environment. Although much of the description of FIG. 5 discusses operation of a specific VM, VM 214A, it is to be noted that the description applies to VM's in general, such as the other VM's 214B-D shown in FIG. 5.

FIG. 7 is a screen diagram of a table 700 that is stored in the database 220 shown in FIG. 5, according to one implementation. In one implementation, each class that is stored within the database 220 is contained within a database table. In FIG. 7, the table 700, named "javaload", contains class information for an exemplary class that, for example, is named "ExampleClass". The table 700 further includes attribute information that is associated with the class. (In other implementations, attribute information may be associated with any resource object that is contained or represented within the database 220.) The attribute information is based upon meta information that has been provided to the database 220. The information within the table 700 has been condensed, or compressed, upon storage within the database 220. During runtime, one or more of the VM's 214A-D decompress the information during class loading operations.

The "javaload" table includes a "length" field, which is an integer, and a "data" field, which is an image. The "javaload" table also has various associated attributes "id", "classname", "jarname", "state", "uploadtime", "packagename", "uname", and "checksum", which each comprise one or more character bytes. In certain situations, one or more of these attribute may not have a value or be used. The "id" attribute is a unique identifier for the particular class. The "id" is a primary key and may specify the unique version of the class (in the case where there are multiple class versions stored in the database 220). Each class stored within the database 220 has an associated, unique "id" attribute, according to one implementation. When there are multiple versions of a class stored in the database 220, each class version has a distinct "id" attribute. However, these multiple class versions would have the same "classname" attribute. In the example of FIG. 7, the "classname" attribute would be equal to "ExampleClass". If there were three separate versions of the "ExampleClass" class stored in the database 220, each would have an associated "classname" attribute of "ExampleClass".

The "jarname" attribute specifies the archive name associated with the class. As described previously, the archive name may be used during class loading operations when utilizing a class path variable to determine which class to retrieve. The "state" attribute is a development flag specifying whether the class is an unofficial, or development, class (or class version). The "uname" attribute specifies the name of a specific developer that may use the development, or unofficial, class during runtime. The "uploadtime" attribute specifies the time at which the class was uploaded and stored in the database 220. This attribute can inherently be used to determine the version of the class. Class versions uploaded and stored earlier are older than class versions that are uploaded and stored afterwards. Analysis of the "uploadtime" attributes from multiple classes can provide versioning information when the "classname" attributes for these classes match.

The "packagename" attribute specifies the name of the package for the class. In certain situations, similar classes may be grouped together into a common package. The VM's 214A-D may use the value of the "packagename" attribute when attempting to load similar classes at runtime. The "checksum" attribute specifies a checksum number calculated for the class when it is stored in the database 220. This attribute can later be used during the class loading process to validate the integrity of the class upon loading.

Figure 8A:
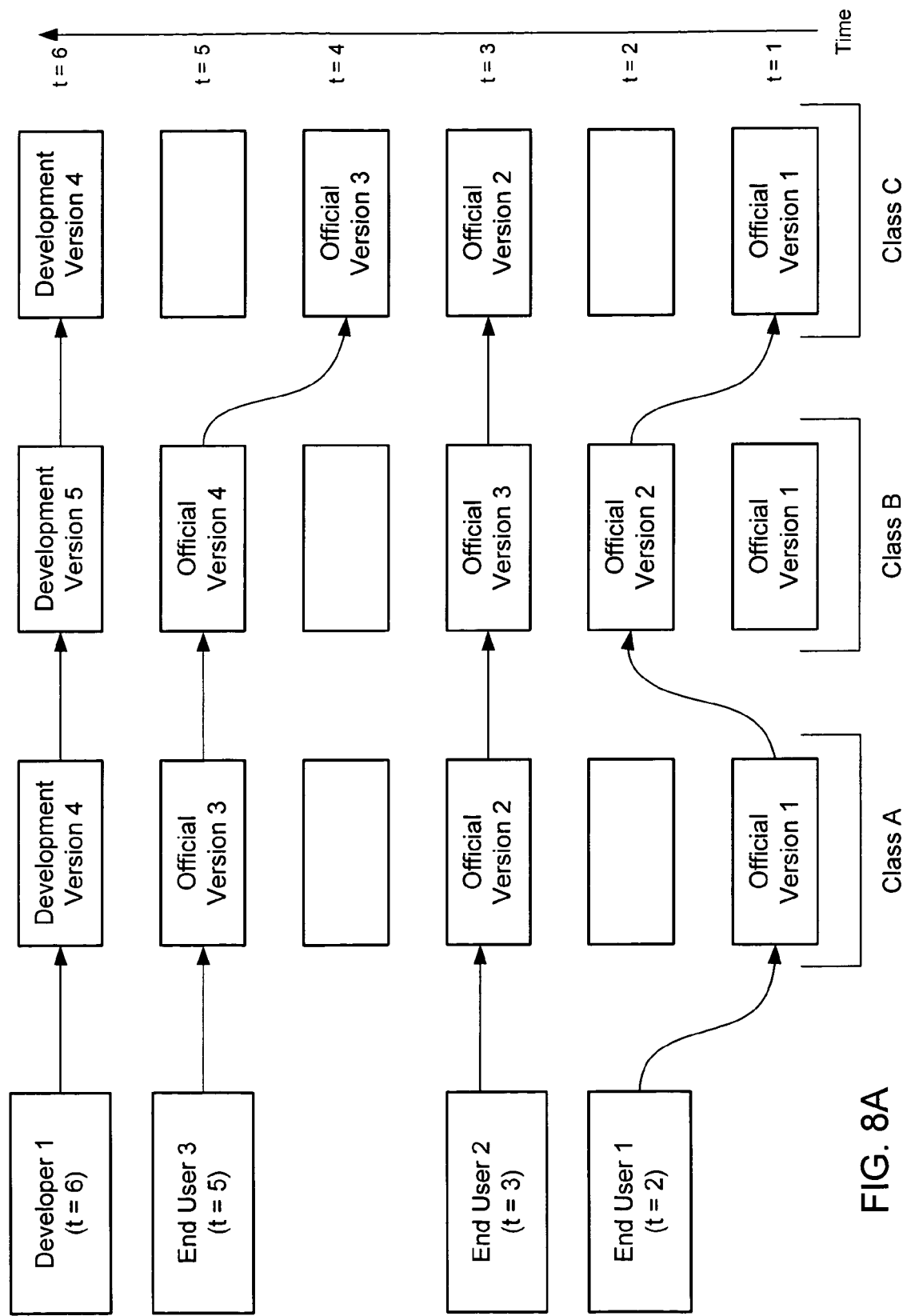
FIG. 8A and FIG. 8B are diagrams showing the use of various versions of classes that are stored in the database shown in FIG. 5, according to one implementation.
Figure 8B:
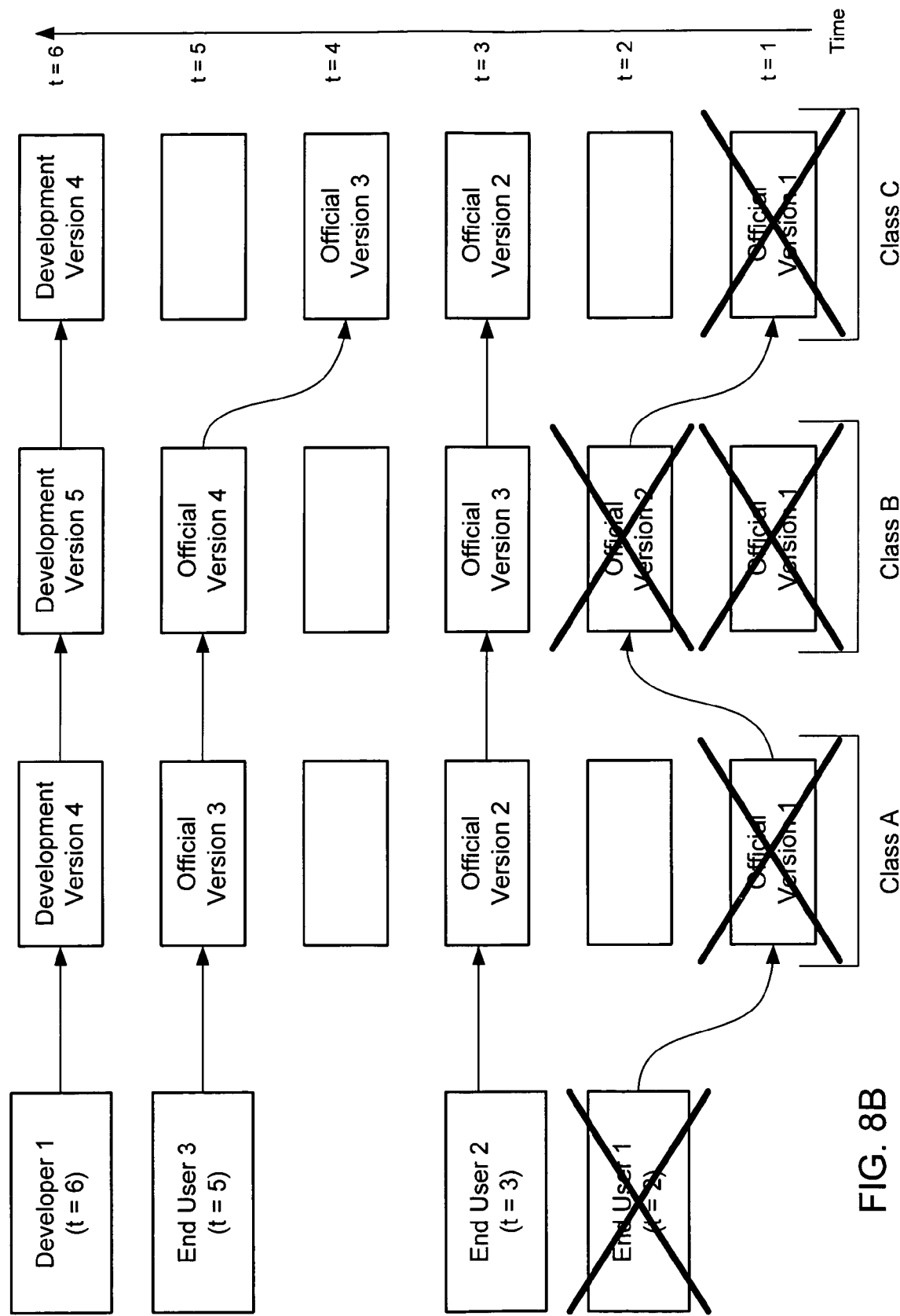

FIG. 8A and FIG. 8B are diagrams showing the use of various versions of classes that are stored in the database 220 shown in FIG. 5, according to one implementation. These diagrams show the use of these various class versions by different users, such as end-users and developers. In these diagrams, it is assumed that there are three distinct classes named "Class A", "Class B", and "Class C". Each of these classes have various different class versions that are deployed and uploaded from the deployment client 201 (shown in FIG. 2) and stored in the database 220. These different class versions may constitute various revisions or modifications that have been made to the class. These class versions can then be loaded and used by various different users, including end-users and developers, when running one or more of the applications 216A-D on the VM's 214A-D.

As is shown in FIG. 8A, four distinct versions of "Class A" have been stored in the database 220. The first version is uploaded and stored at a time "t=1". At a subsequent point in time, "t=3", the second version is uploaded and stored in the database 220, and at "t=5", a third version is uploaded and stored in the database 220. These first, second, and third versions are each official versions of the class "Class A". (The attributes associated with these class versions, such as the "state" and "uploadtime" attributes shown in the example of FIG. 7, indicate that these are official class versions that have been uploaded at specific points in time.) At a time "t=6", a fourth version is uploaded and stored in the database 220. This fourth version is a development version. It is assumed in this example that the fourth class version has an associated user name attribute (such as the "uname" attribute shown in FIG. 7) of "Developer 1". Each of the four class versions also has an associated and common class name attribute (such as the "classname" attribute shown in FIG. 7) of "Class A". The classes "Class B" and "Class C" also have various class versions that have been uploaded and stored in the database 220 at different points in time, as indicated in the diagram of FIG. 8A. These versions include both official and development versions.

At runtime, in the system 500 shown in FIG. 5, one or more of the applications 216A-D in the corresponding VM's 214A-D may process various different runtime sessions. These sessions may include both end-user and developer sessions. End-user sessions utilize official class versions, and developer sessions utilize unofficial, development class versions that may be used and tested in runtime environments. As shown in the example of FIG. 8A, there are four such sessions: three end-user sessions initiated by the end users "end user 1", "end user 2", and "end user 3"; and one developer session initiated by "developer 1". It is assumed that each of these sessions loads one version of each of the classes "Class A", "Class B", and "Class C" for runtime use.

The first end-user session is initiated by "end user 1" at time "t=2". The VM 214A, 214B, 214C, or 214D running this session needs to load one version of each of the classes "Class A", "Class B", and "Class C". In one implementation, three class loaders may be used (one for each of these classes). The VM 214A, 214B, 214C, or 214D loads the most recent versions of each class that were uploaded and stored in the database 220 at a time before or equal to the time of initiation of the session, according to one implementation. As such, the VM 214A, 214B, 214C, or 214D retrieves the first (official) version of "Class A", the second (official) version of "Class B", and the first (official) version of "Classs C". End-user sessions do not have access to unofficial, development class versions stored in the database 220, according to one implementation. Therefore, if the second version of "Class B" were a development version, rather than an official version as shown in FIG. 8A, the VM 214A, 214B, 214C, or 214D would retrieve, instead, the first (official) version of "Class B". As such, the unofficial, development versions of classes stored in the database 220 do not interfere with the runtime operations of end-user sessions, but they are available to development sessions, which allows developers to test and use these class versions in runtime environments.

The second end-user session is initiated by "end user 2" at time "t=3". As such, the VM 214A, 214B, 214C, or 214D retrieves the second (official) version of "Class A", the third (official) version of "Class B", and the second (official) version of "Classs C". Because multiple class versions are stored and maintained in the database 220, the VM 214A, 214B, 214C, and 214D are capable of retrieving different class versions based upon the times at which different application sessions are initiated. These sessions may then utilize different class versions at runtime without interfering with each other.

The third end-user session is initiated by "end user 3" at time "t=5". As such, the VM 214A, 214B, 214C, or 214D retrieves the third (official) version of "Class A", the fourth (official) version of "Class B", and the third (official) version of "Classs C".

The developer session is initiated by "developer 1" at time "t=6". As such, the VM 214A, 214B, 214C, or 214D retrieves the fourth (development) version of "Class A", the fifth (development) version of "Class B", and the fourth (development) version of "Classs C".

At various points in time, end-user or developer sessions may end or be terminated. For example, end users or developers who have finished running their applications may decide to end their corresponding sessions. Alternatively, the VM's 214A-D may also terminate these sessions when certain events or errors occur. In these situations, the VM's 214A-D have the capability to delete obsolete class versions from the database 220 that are no longer being used by active end-user or developer sessions. The deletion of such obsolete class versions conserves storage space in the database 220. FIG. 8B shows an example of a deletion of various versions of the classes "Class A", "Class B", and "Class C". In FIG. 8B, it is assumed that the first end-user session for "user 1" has been terminated. This session had previously accessed and used the first version of "Class A", the second version of "Class B", and the first version of "Class C". Because these class versions are not used by other active sessions, they can be deleted from the database 220. In addition, because the first version of "Class B" is older than the second version of "Class B", it can also be deleted. In one implementation, any user-defined class loaders that are associated only with classes that have been deleted from the database 220 may also be deleted by the VM's 214A-D.

The functional operations described in this specification can be implemented in digital electronic circuitry, or in computer software, firmware, or hardware, including the structural means disclosed in this specification and structural equivalents thereof, or in combinations of them. Various implementations may be provided in one or more computer program products, i.e., one or more computer programs tangibly embodied in an information carrier, e.g., in a machine-readable storage device or in a propagated signal, for execution by, or to control the operation of, data processing apparatus, e.g., a programmable processor, a computer, or multiple computers. A computer program (also known as a program, software, software application, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, subprograms, or portions of code). A computer program can be deployed to be executed on one computer or on multiple computers at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instruction code and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in special purpose logic circuitry.

Various implementations can be provided in a computing system that includes a back-end component (e.g., a data server), a middleware component (e.g., an application server), or a front-end component (e.g., a client computer having a graphical user interface or a Web browser through which a user can interact), or any combination of such back-end, middleware, and front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

Various implementations have been described above, but other implementations can also be provided and are within the scope of the following claims. For example, certain operations can be performed in a different order and still achieve desirable results. In certain implementations, multitasking and parallel processing may be preferable. Other implementations are within the scope of the following claims.

What is claimed is:

1. A computer-readable storage medium comprising instructions which, when executed, cause a machine to:
   create a list of object classes to be deployed into a database by a deployment client over a network;
   identify the object classes, wherein the identifying of the object classes further includes identifying a plurality of object class versions associated with the object classes, identifying an oldest user session using an object class of the object classes, and identifying an object class version associated with the object class being used by the oldest user session, wherein the plurality of object class versions includes the object class version, and deleting one or more object class versions whose associated upload time is older than an upload time associated with an object class version that is loaded by the oldest user session;

associate one or more attributes to each of the object classes based on metadata associated with the object classes, and separately store the object classes and the one or more attributes in the database, wherein the one or more attributes to specify object class version information and object class developer information, the one or more attributes are further to specify a special version of the object classes to be accessed and tested in runtime by one or more developers, wherein the one or more attributes comprise a name that matches a specified name;

retrieve the object classes and the one or more attributes from the database;

select a retrieved object class based on the one or more attributes, wherein the selecting includes
determining if a session executing in a runtime system is associated with a developer, and
if the session is associated with the developer, selecting the object class whose development flag is set; and load the selected object class into a runtime system through a class path to provide a plurality of application servers direct centralized access to the object classes via the database, the database coupled to the plurality of application servers, wherein the class path is to be reused by each of the plurality of application servers each time the application server uses the selected object class.

2. The computer-readable storage medium of claim 1, wherein the runtime system comprises a Java virtual machine or a Common Language Runtime (CLR) virtual machine.

3. The computer-readable storage medium of claim 1, wherein each object class comprises a class.

4. The computer-readable storage medium of claim 1, wherein the attributes associated with each object class further comprise one or more of:
an archive name representing a logical archive with which the object class is associated;
the upload time representing the time at which the object class was stored in the database;
a package name representing a package of which the object class is a part;
a checksum computed on the object class;
the development flag representing whether the object class is a development object class; and
a user name representing a developer to whom the object class belongs.

5. The computer-readable storage medium of claim 4, wherein each object class comprises a class, and wherein the instructions when executed to select one of the retrieved object classes, further cause the machine to:
receive a specification of the class path; and
identify one of the retrieved object classes whose archive name appears first in the class path.

6. The computer-readable storage medium of claim 4, wherein the instructions when executed to select one of the retrieved object classes, further cause the machine to:
receive a specification of a start time associated with a user session executing in the runtime system;
sort the retrieved object classes by the upload time associated with each of the retrieved object classes; and
identify one of the retrieved object classes whose upload time is older than and closest to the start time associated with the user session.

7. The computer-readable storage medium of claim 1, wherein the instructions when executed to select one of the retrieved object classes, further cause the machine to:
receive a specification of a name associated with the session; and
if the session is associated with a developer, identify one or more of the retrieved object classes whose associated user name matches the name associated with the session.

8. The computer-readable storage medium of claim 1, wherein the database stores object classes in a compressed format, and wherein the instructions when executed, further cause the machine to:
decompress the selected object class.

9. The computer-readable storage medium of claim 4, wherein the instructions when executed, further cause the machine to:
use the checksum associated with the selected object class to validate the integrity of the selected object class.

10. A method comprising:
creating a list of object classes to be deployed into a database by a deployment client over a network;
identifying the object classes, wherein the identifying of the object classes further includes identifying a plurality of object class versions associated with the object classes, identifying an oldest user session using an object class of the object classes, and identifying an object class version associated with the object class being used by the oldest user session, wherein the plurality of object class versions includes the object class version, and deleting one or more object class versions whose associated upload time is older than an upload time associated with an object class version that is loaded by the oldest user session;

associating one or more attributes to each of the object classes based on metadata associated with the object classes, and separately storing the object classes and the one or more attributes in the database, wherein the one or more attributes to specify object class version information and object class developer information, the one or more attributes are further to specify a special version of the object classes to be accessed and tested in runtime by one or more developers, wherein the one or more attributes comprise a name that matches a specified name;

retrieving the object classes and the one or more attributes from the database;

selecting a retrieved object class based on the one or more attributes, wherein the selecting includes
determining if a session executing in a runtime system is associated with a developer, and
if the session is associated with the developer, selecting the object class whose development flag is set; and loading the selected object class into a runtime system through a class path to provide a plurality of application servers direct centralized access to the object classes via the database, the database coupled to the plurality of application servers, wherein the class path is to be reused by each of the plurality of application servers each time the application server uses the selected object class.

11. An apparatus comprising:
means for creating a list of object classes to be deployed in a database by a deployment client over a network;
means for identifying the object classes, wherein the means for identifying of the object classes further includes means for identifying a plurality of object class versions associated with the object classes, means for identifying an oldest user session using an object class of the object classes, and means for identifying an object class version associated with the object class being used by the oldest user session, wherein the plurality of object class versions includes the object class version, and means for deleting one or more object class versions whose associated upload time is older than an upload time associated with an object class version that is loaded by the oldest user session;

means for associating one or more attributes to each of the object classes based on metadata associated with the object classes, and means for separately storing the object classes and the one or more attributes in the database, wherein the one or more attributes to specify object class version information and object class developer information, the one or more attributes are further to specify a special version of the object classes to be accessed and tested in runtime by one or more developers, wherein the one or more attributes comprise a name that matches a specified name;

means for retrieving the object classes and the one or more attributes from the database;

means for selecting a retrieved object class based on the one or more attributes, wherein the means for selecting includes
  means for determining if a session executing in a runtime system is associated with a developer, and
  means for selecting the object class whose development flag is set if the session is associated with the developer; and means for loading the selected object class through a class path into a runtime system to provide a plurality of application servers direct centralized access to the object classes via the database, the database coupled to the plurality of application servers, wherein the class path is to be reused by each of the plurality of application servers each time the application server uses the selected object class.

12. The method of claim 10, wherein the runtime system comprises a Java virtual machine or a Common Language Runtime (CLR) virtual machine.

13. The method of claim 10, wherein each object class comprises a class.

14. The apparatus of claim 11, wherein the runtime system comprises a Java virtual machine or a Common Language Runtime (CLR) virtual machine.

15. The apparatus of claim 11, wherein each object class comprises a class.

16. A system comprising:
a client coupled to a server;
a database coupled to the client and the server; and
the server in communication with a plurality of application servers, the server to:
receive a list of object classes to be deploy into the database from a deployment client, identify the object classes, wherein the identifying of the object classes further includes identifying a plurality of object class versions associated with the object classes, identifying an oldest user session using an object class of the object classes, and identifying an object class version associated with the object class being used by the oldest user session, wherein the plurality of object class versions includes the an object class version, and delete one or more object class versions whose associated upload time is older than an upload time associated with an object class version that is loaded by the oldest user session, associate one or more attributes to each of the object classes based on metadata associated with the object classes, and separately store the object classes and the one or more attributes in the database, wherein the one or more attributes to specify object class version information and object class developer information, the one or more attributes are further to specify a special version of the object classes to be accessed and tested in runtime by one or more developers, wherein the one or more attributes comprise a name that matches a specified name, retrieve the object classes and the one or more attributes from the database, select a retrieved object class based on the one or more attributes, wherein the selecting includes
  determining if a session executing in a runtime system is associated with a developer, and
  if the session is associated with the developer, selecting the object class whose development flag is set; and load the selected object class into a runtime system through a class path to provide a plurality of application servers direct centralized access to the object classes via the database, wherein the class path is to be reused by each of the plurality of application servers each time the application server uses the selected object class.

17. The system of claim 16, wherein the runtime system comprises a Java virtual machine or a Common Language Runtime (CLR) virtual machine.

18. The system of claim 16, wherein each object class comprises a class.

19. The system of claim 16, wherein the attributes associated with each object class further comprise one or more of:
  an archive name representing a logical archive with which the object class is associated;
  the upload time representing the time at which the object class was stored in the database;
  a package name representing a package of which the object class is a part;
  a checksum computed on the object class;
  the development flag representing whether the object class is a development object class; and
  a user name representing a developer to whom the object class belongs.

20. The computer-readable storage medium of claim 1, wherein the instructions when executed further cause the machine to:
  unpack individual classes in the list from an archive to be deployed individually as a part of a virtual archive in the database by an application server from the plurality of application servers.

21. The computer-readable storage medium of claim 1, wherein the instructions when executed further cause the machine to:
  provide a graphical user interface to enable a user to create the list of object classes.

22. The computer-readable storage medium of claim 1, wherein deleting one or more object class versions whose associated upload time is older than the upload time associated with an object class version that is loaded by the oldest user session deletes the one or more object class versions from the database.

* * * * *